United States Patent [19]

Prosch et al.

[11] Patent Number: 5,794,512
[45] Date of Patent: Aug. 18, 1998

[54] MASTER CYLINDER

[75] Inventors: Gerhard Prosch; Christian Sperner, both of Höchstadt/Aisch; Herbert Folk, Burghaslach, all of Germany

[73] Assignee: Ina Wälzlager Schaeffler KG, Herzoednaurach, Germany

[21] Appl. No.: 670,508

[22] Filed: Jun. 27, 1996

[30] Foreign Application Priority Data

Jun. 27, 1995 [DE] Germany .................. 195 23 215.1

[51] Int. Cl.⁶ .................................................. F16J 1/14
[52] U.S. Cl. ........................ 92/128; 92/188; 403/122; 403/133
[58] Field of Search .......................... 92/187, 188, 128; 403/122, 76, 133

[56] References Cited

U.S. PATENT DOCUMENTS

| | | | |
|---|---|---|---|
| 5,163,773 | 11/1992 | Denney et al. | 403/133 |
| 5,290,120 | 3/1994 | Osterfeld et al. | 92/187 |
| 5,335,585 | 8/1994 | Fischenich et al. | 92/128 |
| 5,499,570 | 3/1996 | Bergelin et al. | 403/133 |

FOREIGN PATENT DOCUMENTS

| | | |
|---|---|---|
| PS 11 97 770 | 4/1966 | Germany . |
| OS 20 43 654 | 3/1972 | Germany . |
| 31 49 628 A1 | 7/1983 | Germany . |
| 42 12 107 A1 | 10/1993 | Germany . |
| 407 148 | 3/1934 | United Kingdom . |

Primary Examiner—Thomas E. Denion
Attorney, Agent, or Firm—Henry M. Feiereisen

[57] ABSTRACT

A master cylinder for use in a hydraulically actuated clutch or brake system of a motor vehicle, includes a casing formed with a bore, and a piston unit axially displaceable within the bore. The piston unit includes a piston-shaft sleeve received in the bore and having one end formed with a bottom to define an interior, at least two retainer shells received in the interior of the sleeve free of play, and a piston rod having a spherical head swingably mounted to the retainer shells and provided to respond to a manual actuation of a pedal. The retainer shells are each formed at a pedal-proximate end of the piston-shaft sleeve with a spherical recess to define a ball socket in which the spherical head snaps in and is received in form-fitting manner.

19 Claims, 4 Drawing Sheets

MASTER CYLINDER

BACKGROUND OF THE INVENTION

The present invention refers to a master cylinder for a hydraulic clutch or brake system of a motor vehicle, and in particular to a piston assembly for use in a master cylinder.

In general, the master cylinder assumes the function to translate a foot pedal action (brake pedal or clutch pedal) into hydraulic pressure by converting the applied pedal force into pressure in the brake or clutch fluid system. Typically, the master cylinder includes a casing which has a bore to define a pressure compartment and to guide a piston during axial displacement therein.

A master cylinder of this type is known from U.S. Pat. No. 5,335,585 and includes a guide bushing of plastic material which is axially fixed in the casing by a snap connection and projects out of the casing at the pedal-proximate end. Set within the guide bushing for axial displacement is a piston assembly which includes a piston-shaft sleeve and a piston head which extends out of a piston neck and faces the pressure compartment. The piston head is thus positioned in front of the piston-shaft sleeve, with the piston neck being guided by the bottom of the piston-shaft sleeve. The piston assembly further includes a piston rod which extends at the piston head distant end of the piston neck and forms a connection to the manually actuated pedal. The piston rod terminates in a spherical head to form a connection with the piston such that the piston rod is permitted to swing with respect to the piston. The spherical head is held in a form-fitting and clearance-free manner between two retainer shells which are set within the piston-shaft sleeve. In a master cylinder of this type, the piston arrangement requires an assembly of numerous single components which must be manufactured at narrow tolerances. Thus, the assembly is cumbersome and complicated thereby significantly increasing the overall production costs.

SUMMARY OF THE INVENTION

It is an object of the present invention to provide an improved master cylinder of the aforementioned type, obviating the afore-stated drawbacks.

In particular, it is an object of the present invention to provide an improved master cylinder with a piston of a design that permits optimized production conditions and simplified assembly.

These objects and others which will become apparent hereinafter are attained in accordance with the present invention by forming a piston-shaft sleeve which is closed on one end by a bottom and encloses at least two retainer shells, which are fitted within the interior of the piston-shaft sleeve in a clearance-free manner and are formed at a pedal-proximate end of the piston-shaft sleeve with complementary spherical recesses to define a ball socket in which the spherical head snaps in and is received in form-locking manner.

The configuration of the piston and the attachment between the piston rod and the piston via the spherical head, in accordance with the present invention, effects a significant reduction of components that require narrow manufacturing tolerances so that the assembly is significantly facilitated and the production of the master cylinder according to the invention can be carried is a most cost-efficient manner, also for manufacture on a large scale. Moreover, as the piston-shaft sleeve is closed on one end by the bottom, there is no need to incorporate a seal between the retainer shells and the piston-shaft sleeve.

Advantageously, the retainer shells fully occupy or fill the cylindrical interior of the piston-shaft sleeve only in the area of the ball socket, while in the remaining section, the retainer shells are formed by a web assembly with longitudinal web for guidance along the inside wall surface of the piston-shaft sleeve. Thus, the retainer shells can be produced preferably by injection molding at a configuration which can best be suited to the injection molding cycle so that material accumulation is avoided. Moreover, the overall weight of the retainer shells is significantly reduced. Suitably, the retainer shells are made as mirror images of each other to further decrease the manufacturing costs. In order to effect a precise alignment and securement of the retainer shells with each other, the retainer shells are formed with fixing means in mirror symmetrical relationship.

According to another feature of the present invention, the retainer shells are connected together by a hinge-like joint, e.g. via a stripehinge, to effect an automated assembly and a safeguard against loss of the retainer shells. The joint is formed at an end face or in longitudinal direction laterally on the outer surface area between the two retainer shells.

In order to prevent the ball socket from generating noise, the retainer shells, i.e. the ball socket joint and/or the spherical head is formed with grooves, recesses or blind bores to exhibit lubricant pockets that serve as lubricant reservoirs to continuously lubricate the ball socket joint. Lubrication of the ball socket joint not only reduces friction and thus wear but also decreases generation of noise. Alternatively, the ball socket and/or the spherical head may also be coated with a dry lubricant, e.g. PTFE (teflon), molybdenum disulfide or graphite.

The piston-shaft sleeve is preferably made of sheet metal in noncutting manner and is formed on the bottom-distant open end with a circumferential flange that is radially turned inwardly to thereby ensure a fixation of the retainer shells within the piston-shaft sleeve in a play-free manner.

According to another feature of the present invention, each retainer shell is formed with spaced longitudinal slots extending about the circumference toward the center of the ball socket to provide the retainer shell with at least one segment. At the free end, the segment is formed with a snap nose which is directed radially inwardly and reaches the outer wall of the piston rod to sufficiently overlap the piston rod and to effect a secure fit.

In order to enable a radial deflection of the segments, each retainer shell is formed with a radial circumferential deflection space in an area of the segments to enable the segments to escape in radial direction during insertion of the spherical head.

The spherical head and the snap noses of the segments have a degree of overlap of $\geq 5\%$ to $\leq 30\%$, with the snap noses being formed at the pedal side with a circumferential chamfer and exhibiting in direction of the ball socket a sharp-edged configuration to form an undercut. In this manner, the insertion of the spherical head into the ball socket is facilitated, and the spherical head is securely fixed in the ball socket and prevented from unintentional detachment.

Suitably, the piston-shaft sleeve is formed in non-cutting manner on its outer wall with an axial groove at the end facing the pressure compartment to ensure that a passageway is created for hydraulic fluid to flow from the inlet port of the casing into the pressure compartment. The axial groove is defined by an axial dimension which exceeds an axial distance between a contact area on the piston-shaft sleeve of a sealing lip of the piston seal and the bottom of the piston-shaft sleeve. A wear of the sealing lip can be reduced by rounding the junctions on the piston-shaft sleeve between the axial groove and the outer wall.

According to another feature of the present invention, the outer wall of the piston-shaft sleeve is suitably treated and/or coated with a coating to reduce friction and reduce wear of the sealing lip.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
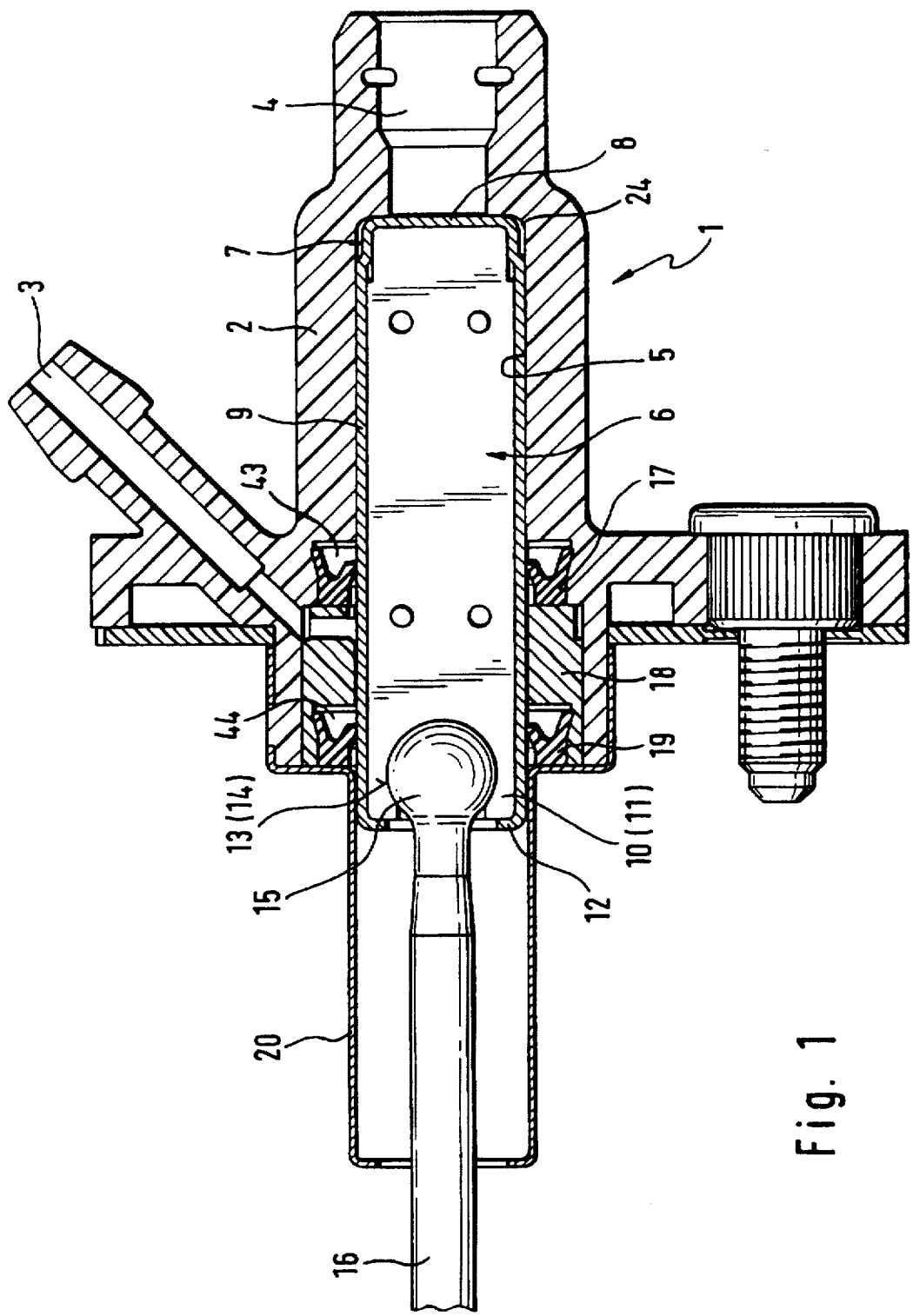
FIG. 1 is a longitudinal section of one embodiment of a master cylinder according to the present invention.

Throughout all the Figures, the same or corresponding elements are always indicated by the same reference numerals.

Turning now to the drawing, and in particular to FIG. 1, there is shown a longitudinal section of one embodiment of a master cylinder according to the present invention, generally designated by reference numeral 1 for translating an applied pedal force into hydraulic pressure. The master cylinder 1 has a casing 2 which is made of plastic material and exhibits an inlet port 3 for incoming hydraulic fluid and an outlet port 4 for forwarding hydraulic fluid to a slave cylinder (not shown). The casing 2 is formed with a bore 5 to define a pressure compartment 7 for guidance of a piston 6 which has one end formed by a bottom 8 that bounds the pressure compartment 7 in axial direction together with the outlet port 4.

The piston 6 includes a piston-shaft sleeve 9, which is made e.g. of sheet metal and is formed integrally with the bottom 8, and two retainer shells 10, 11 which are received within the piston-shaft sleeve 9. At the bottom-distant end thereof, the piston-shaft sleeve 9 is open and exhibits extreme edges which are radially turned inwards to form flanges 12 so as to fix the retainer shells 10, 11 in a form-fitting manner and free of play. The retainer shells 10, 11 are formed with complementary spherical recesses 13, 14 to form a ball socket at the side facing the bottom-distant end of the piston 6 for receiving a spherical head 15 which is formed in one piece with a piston rod 16 that is connected to the manually actuated brake pedal or clutch pedal. Thus, the piston 6 is axially displaceable within the bore 5 by the piston rod 16 via the spherical head 15 between an initial position in which hydraulic fluid enters the pressure compartment 7 and an operating position in which the piston 6 executes a working stroke to push hydraulic fluid from the pressure compartment 7 through the outlet port 4 to the slave cylinder in response to an actuation of the pedal of a brake or clutch system.

In order to effectively seal an annular gap between the casing 2 and the piston 6, a primary (main) seal 17 is fitted in a cylindrical recess 43 of the casing 2 and secured to a seal carrier 18. At the opposing side distant to the primary seal 17, the seal carrier 18 is formed with a cylindrical recess 44 for receiving a secondary seal 19 for sealing the piston 6 from a guide bushing 20 which supports the secondary seal 19 and surrounds the piston rod 16 for protection against penetration of dirt. The guide bushing 20 is mounted to the casing 1 in form-fitting manner and defines a hollow-cylindrical section for guiding the piston 6 during its return stroke from the operating position to the initial position. In order to reduce friction and reduce wear of the primary and secondary seals 17, 18 during back-and-forth movement of the piston 6, the outer wall surface of the piston-shaft sleeve 9 is suitably surface treated and/or lined with a coating, e.g. PTFE (teflon), molybdenum disulfide or graphite.

Figure 2:
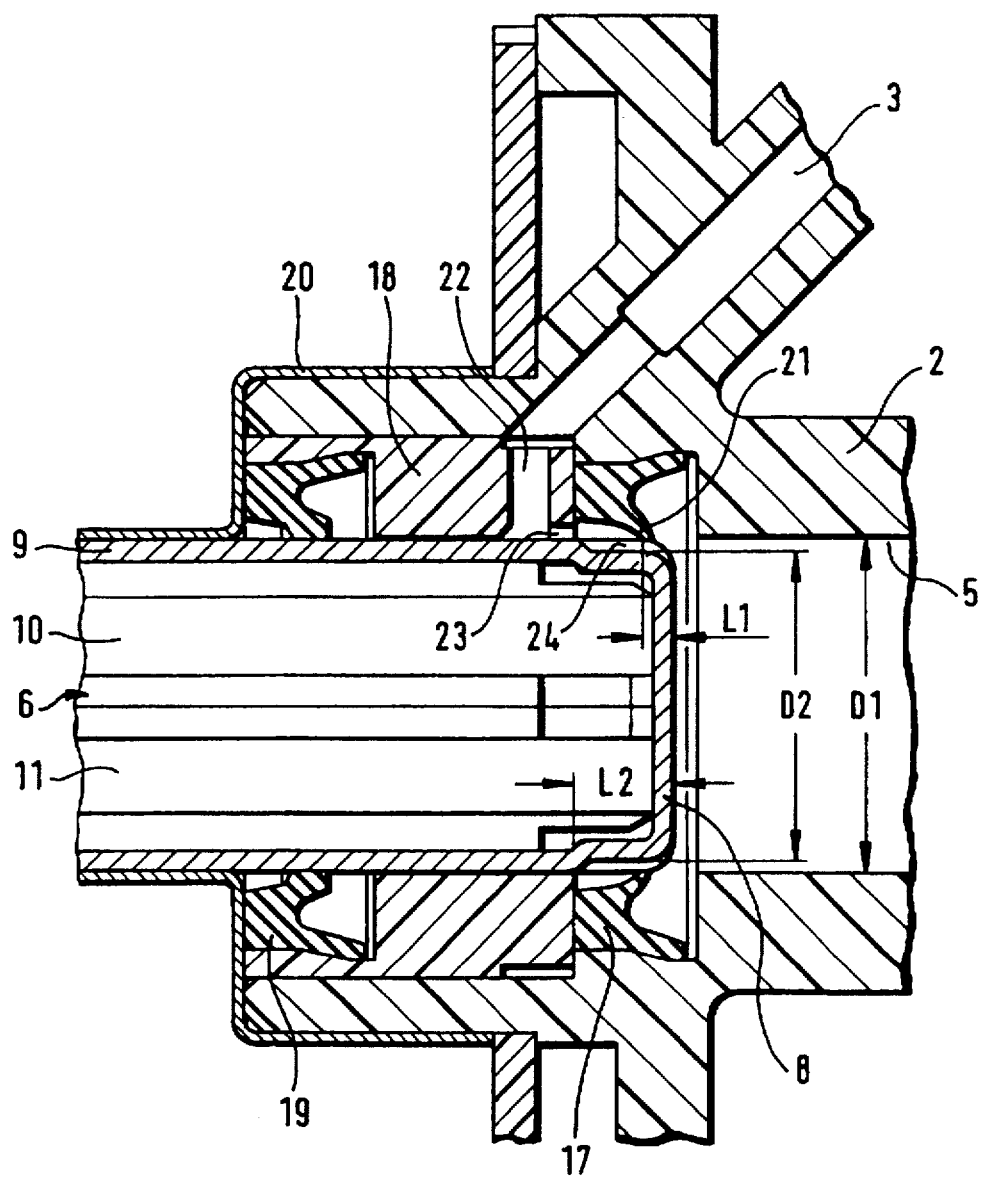
FIG. 2 is a fragmentary sectional view, on an enlarged scale, of the master cylinder of FIG. 1, illustrating in detail the bottom area of the piston occupying an initial position.

Turning now to FIG. 2, there is shown a fragmentary sectional view, on an enlarged scale, of the master cylinder 1 and illustrating in detail the piston 6 occupying its initial position and received in the guide bushing 20. The primary seal 17 is formed with a sealing lip 21 which bears upon the bottom-proximate end of the piston-shaft sleeve 9. In order to enable a pressureless flow of hydraulic fluid from the inlet port 3 into the pressure compartment 7 during the return stroke of the piston 6, the seal carrier 18 is formed with a passageway 22 extending in prolongation of the inlet port 3 and across the seal carrier 18 for connection to an axial channel 23 which effects a change of flow direction of hydraulic fluid toward the primary seal 17. A transfer of hydraulic fluid into the pressure compartment 7 is effected via an axial groove 24 which is formed within the piston-shaft sleeve 9 in non-cutting manner and exhibits rounded junctions to the outer wall surface of the piston-shaft sleeve 9. The axial groove 24 is defined by a base diameter $D_2$ which is smaller that the diameter $D_1$ defined by the pressure compartment 7 so as to allow an unobstructed passage of hydraulic fluid into the pressure compartment 7. The axial groove 24 has thus a depth which can be determined on the basis of the different diameters in accordance with the relation $(D_1-D_2)/2$. In order to ensure a sufficient transfer of hydraulic fluid, the depth of the axial groove 24 is in the range of 0.1 to 0.5×S, with S being the wall thickness of the piston-shaft sleeve 9. The axial groove 24 has an axial dimension $L_2$ that is defined by the distance from an end face of the bottom 8 to the end of the axial groove 24, and exceeds an axial dimension $L_1$ which is defined by the distance between an area of contact of the sealing lip 21 and the end face of the bottom 8, whereby the length $L_1$ corresponds to the wall thickness of the piston-shaft sleeve 9 up to six times the wall thickness. Preferably the length $L_2$ ranges from 1.1 times to 3 times the value of $L_1$.

Figure 3:
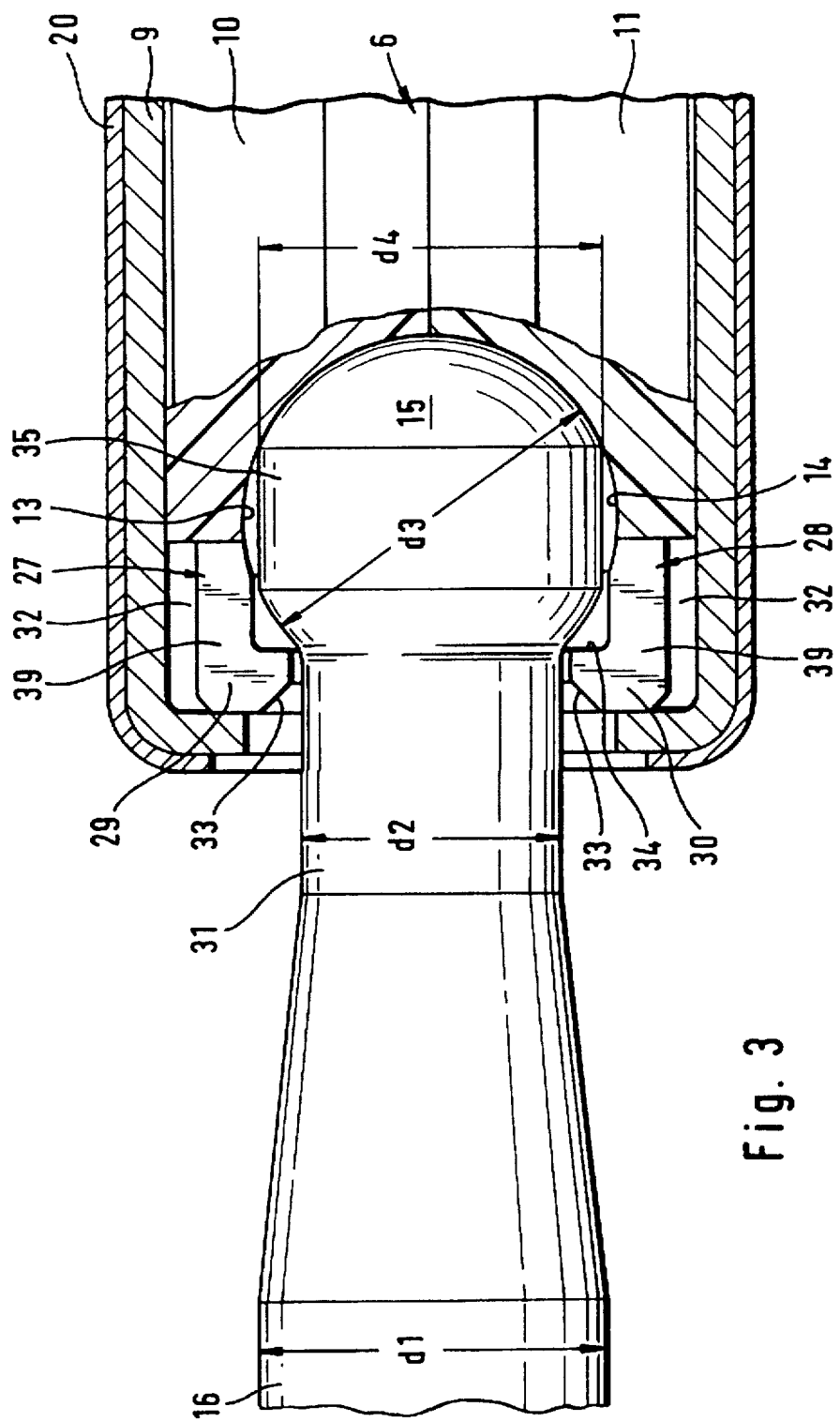
FIG. 3 is a fragmented sectional view, on an enlarged scale, of the master cylinder of FIG. 1, illustrating in detail a form-locking securement between the spherical head of the piston rod and the piston.

Referring now to FIG. 3, there is shown a fragmentary sectional view, on an enlarged scale, of the master cylinder 1, illustrating in detail the connection between the piston rod 16 and the piston 6 via the spherical head 15. The retainer shells 10, 11 are formed with complementary semispherical recesses 13, 14 to form a ball socket for receiving and guiding the spherical piston head 15 in form-locking manner. A force-fitting securement of the retainer shells 10, 11 is effected through provision of slots at their end faces to form segments 27, 28 of an axial length substantially corresponding to the distance between the center of the spherical head 15 to the inside wall surface of the piston-shaft sleeve 9 at the bottom-distant end. The segments 27, 28 are formed at their end faces with radially inwardly directed snap noses 29, 30 which extend to the immediate proximity of the cylindrical outer surface area of a piston rod neck 31. The insertion of the spherical head 15 into the ball socket as formed by the complementary recesses 13, 14 of the retainer shells 10, 11 can be simplified by providing a deflection space 32 in a forward area of the outer wall of the retainer shells 10, 11. Thus, upon securement of the spherical head 15 in the ball socket of the retainer shells 10, 11, the segments 27, 28 can radially move out. After the spherical head 15 is properly positioned in place within the ball socket, the elastic properties of the segments 27, 28 automatically return them to their initial state, with the snap noses 29, 30 engaging behind the spherical head 15, to thereby effect a secure and form-fitting placement of the spherical head 15 and an attachment of the piston rod 16 to the piston 6.

The insertion of the spherical head 15 into the ball socket formed by the recesses 13, can be further facilitated by forming the snap noses 29, 30 at their radially inwardly directed extreme edges with a circumferential bevel 33. At their bevel-distant side, the snap noses 29, 30 are formed with a sharp-edges junction between the radially inwardly directed section and the axially directed section to form an undercut 34 through which an unintended disengagement of the spherical head 15 from the ball socket is effectively eliminated.

FIG. 3 further shows the extent of overlap between the segments 27, 28 and their snap noses 29, 30, on the one hand, and the spherical head 15, on the other hand. The spherical head 15 is formed with a flattened area 35 to exhibit a partially cylindrical outer wall, as defined by a diameter $d_4$ which is smaller than a diameter $d_3$ defined by the spherical head 15. As the segments 27, 28 exhibit an axial dimension that reaches the zone of the flattened area 35 and the snap noses 29, 30 exhibit a radial dimension that reaches the outer surface area of the piston rod neck 31, an overlap is effected which corresponds to the diameter difference of $d_4 - d_2$, with $d_4$ representing the diameter of the flattened area and $d_2$ representing the diameter of the neck 31. Tests have shown that a degree of overlap of $\geq 5\%$ to $\leq 30\%$ is preferred.

Figure 4:
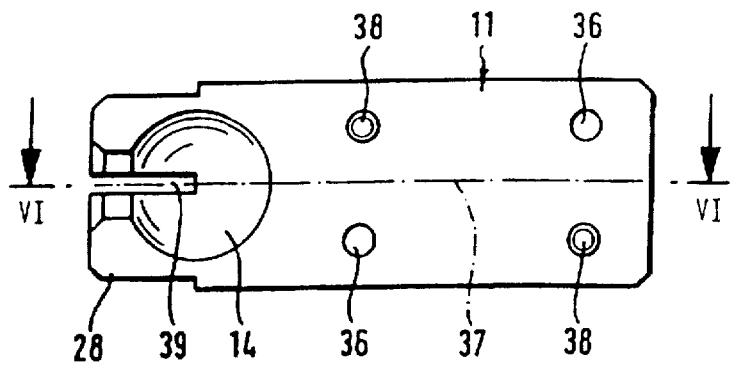
FIG. 4 is a schematic plan view of a retainer shell for securing the spherical head to the piston.

FIG. 4 shows an exemplified, schematic plan view of the retainer shell 11, and it can be seen that the retainer shell 11 is formed in the area facing away from the recess 14 with a pair of bores 36 and a pair of injection molded engagement pins 38 which are spaced at a same distance from a longitudinal axis 37 of the retainer shell 11 and oppose each other diametrically with regard to the longitudinal axis 37. The engagement pins 38 are positioned on the retainer shell 11 in such a manner that they fit in complementary bores 36 of the retainer shell 10 in the assembled state to thereby positionally secure both retainer shells 10, 11. A placement of the bores 36 in this manner permits a mirror symmetrical configuration of the retainer shells 10, 11, and thus as the retainer shells 10, 11 are of identical design, only one mold is required for making the retainer shells 10, 11.

In the area of the recess 14, the retainer shell 11 is formed with a longitudinal slot 39 to divide the end face area of the retainer shell 11 in segments 28.

Figure 5:
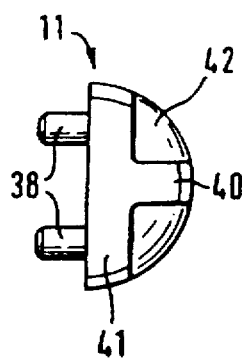
FIG. 5 is a side view of the retainer shell of FIG. 4.

FIG. 5 is a side view of the retainer shell 11 to illustrate the semispherical profile thereof and the formation of a web assembly of generally T-shaped configuration. The web assembly includes a cross web 41 which bears on both sides on the inside wall surface of the piston-shaft sleeve 9, and a longitudinal rib 40 formed in one piece with the cross web 41 and guided at its free end along the piston-shaft sleeve 9. As a result of the T-shaped configuration of the web assembly, hollow spaces 42 are formed which enhance the production of the retainer shells 10, 11 through injection molding, i.e. positively influence the injection molding cycle, and additionally avoid a material accumulation.

Figure 6:
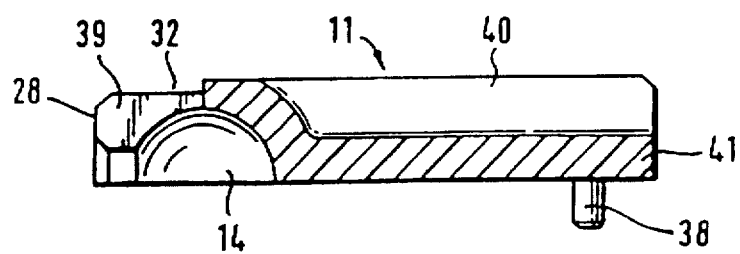
FIG. 6 is a longitudinal section of the retainer shell of FIG. 4, taken along the line VI—VI in FIG. 4.

FIG. 6 shows a longitudinal section of the retainer shell 11, and it can be seen that the retainer shell 11 substantially fills the cylindrical space formed by the piston-shaft sleeve 9 in the area of the semispherical recess 14, except for the circumferential deflection space 32 that is formed in the forward area of the retainer shell 14. Also depicted in FIG. 6 is the longitudinal slot 39 that extends from the center of the recess 14 to the end face of the retainer shell 11.

Figure 7:
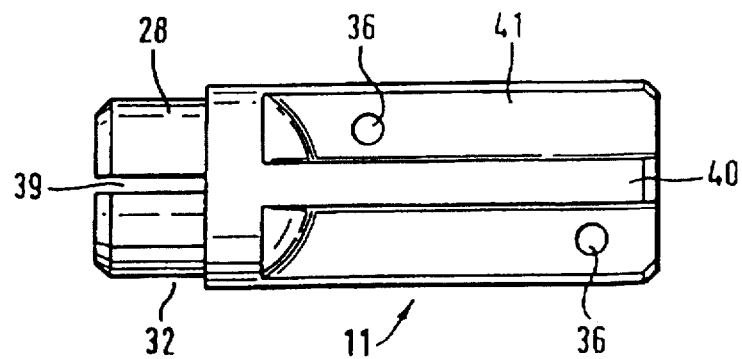
FIG. 7 is a top plan view of a retainer shell according to FIG. 4.

FIG. 7 is a top plan view of the retainer shell 11 to depict the transition areas between the cross web 41 and the longitudinal rib 40, on the one hand, and the solid cylindrical section of the retainer shell 11 in the area of the recess 14. Also shown is the segmentation of the retainer shell 11 at the end face thereof as a result of the longitudinal slots 39.

Figure 8:
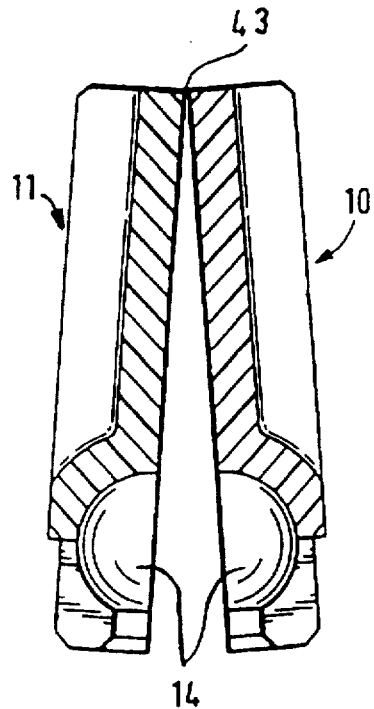
FIG. 8 is a partially sectional view of two retainer shells, illustrating their connection at one end via a hinge-like joint.

As shown in FIG. 8, the retainer shells 10, 11 are suitably connected to each other at an end face thereof by a hinge-like joint 43 that allows a relative adjustment therebetween while yet prevents the retainer shells 10, 11 from detaching from one another.

While the invention has been illustrated and described as embodied in a master cylinder, it is not intended to be limited to the details shown since various modifications and structural changes may be made without departing in any way from the spirit of the present invention.

What is claimed as new and desired to be protected by Letters Patent is set forth in the appended claims:

1. A master cylinder for use in a hydraulically actuated clutch or brake system of a motor vehicle, comprising:
   a casing formed with a bore; and
   a piston means axially displaceable within the bore between an initial position and a working position, said piston means including a piston-shaft sleeve received in the bore and having opposite axial ends, with one axial end at an operator-actuated pedal-distal side being closed by a bottom in single-piece configuration with the piston-shaft sleeve, thereby defining an interior, at least two retainer shells extending between the axial ends and supported free of play in the interior by an inner wall of the piston-shaft sleeve, and a piston rod terminating in a spherical head which is swingably mounted to the retainer shells and provided to respond to a manual actuation of a pedal,
   each of said retainer shells being formed at a pedal-proximate end of the piston-shaft sleeve with a spherical recess to define a ball socket in which the spherical head snaps in and is received in form-locking manner.

2. The master cylinder of claim 1 wherein the interior of the piston-shaft sleeve is of cylindrical configuration to define a cylindrical space, said retainer shells filling the cylindrical space only in an area of the ball socket and being formed with a web assembly for guidance in a remaining area on an inner wall surface of the piston-shaft sleeve.

3. The master cylinder of claim 2 wherein the web assembly includes at least one element selected from the group consisting of a longitudinal rib and a cross web.

4. The master cylinder of claim 1 wherein the retainer shells have fastening means in mirror image configuration for effecting an accurate connection of the retainer shells with one another.

5. The master cylinder of claim 2 wherein the retainer shells are connected together by a hinge-like joint.

6. The master cylinder of claim 5 wherein the hinge-like joint is formed at an end face of the retainer shells.

7. The master cylinder of claim 5 wherein the hinge-like joint is formed laterally at an outer wall surface of the retainer shells.

8. The master cylinder of claim 1 wherein one of the elements selected from the group consisting of ball socket and spherical head is formed with an element selected from the group consisting of groove, recess and blind bore to exhibit a lubricant pocket for forming a lubricant reservoir.

9. The master cylinder of claim 1 wherein one of the elements selected from the group consisting of ball socket and spherical head is lined with a coating of dry lubricant.

10. The master cylinder of claim 9 wherein the dry lubricant is made of a material selected from the group consisting of PTFE, molybdenum disulfide and graphite.

11. The master cylinder of claim 1 wherein the piston-shaft sleeve is made in noncutting manner, with the other axial end of the piston-shaft sleeve at the operator-actuated pedal-proximate side being formed with a circumferential flange which is directed radially inwardly.

12. The master cylinder of claim 1 wherein each said retainer shell is formed about its circumference with spaced longitudinal slots directed to the center of the ball socket to provide the retainer shell with at least one segment defined by a free end which exhibits a snap nose directed radially inwardly and reaching an outer wall surface of the piston rod.

13. The master cylinder of claim 12 wherein the retainer shell is formed with a radial circumferential deflection space in an area of the segment.

14. The master cylinder of claim 12 wherein the spherical head and the snap nose have a degree of overlap of $\geq 5\%$ to $\leq 30\%$, with the snap nose being formed at the pedal end with a circumferential chamfer and exhibiting in direction of the ball socket a sharp-edged configuration to form an undercut.

15. The master cylinder of claim 1 wherein the bore defines a pressure compartment, said piston-shaft sleeve having an outer wall surface exhibiting at least one axial groove formed on one end in non-cutting manner and directed toward the pressure compartment.

16. The master cylinder of claim 15, and further comprising sealing means for sealing the piston from the casing, said sealing means including a primary seal exhibiting a sealing lip bearing on the bottom in an initial position of the piston, said axial groove exhibiting an axial dimension which exceeds a distance between a contact area of the sealing lip and the bottom of the piston-shaft sleeve when the piston occupies the initial position.

17. The master cylinder of claim 15 wherein the piston-shaft sleeve has rounded junctions between its outer wall surface and the axial groove.

18. The master cylinder of claim 1 wherein the piston-shaft sleeve has an outer wall surface which is surface treated.

19. The master cylinder of claim 1 wherein the piston-shaft sleeve has an outer wall surface which is lined with a coating.

* * * * *

UNITED STATES PATENT AND TRADEMARK OFFICE
CERTIFICATE OF CORRECTION

PATENT NO. : 5,794,512
DATED : August 18, 1998
INVENTOR(S) : Gerhard Prosch, Christian Sperner & Herbert Folk It is certified that error appears in the above-identified patent and that said Letters Patent is hereby corrected as shown below:

On the title page, item

[73] Assignee: change "Herzoednaurach" to
                  --Herzogenaurach--

Signed and Sealed this

Eighth Day of December, 1998

*Attest:*

BRUCE LEHMAN

*Attesting Officer*      *Commissioner of Patents and Trademarks*